United States Patent
Grimaud

(10) Patent No.: US 9,919,478 B2
(45) Date of Patent: Mar. 20, 2018

(54) 3D FONTS FOR AUTOMATION OF DESIGN FOR MANUFACTURING

(71) Applicant: Dassault Systemes, Velizy Villacoublay (FR)

(72) Inventor: Jean-Jacques Grimaud, Winchester, MA (US)

(73) Assignee: Dassault Systemes, Velizy Villacoublay (FR)

( * ) Notice: Subject to any disclaimer, the term of this patent is extended or adjusted under 35 U.S.C. 154(b) by 284 days.

(21) Appl. No.: 14/790,680

(22) Filed: Jul. 2, 2015

(65) Prior Publication Data
US 2017/0001376 A1  Jan. 5, 2017

(51) Int. Cl.
| | |
|---|---|
| *G06F 19/00* | (2011.01) |
| *B29C 67/00* | (2017.01) |
| *G06F 3/12* | (2006.01) |
| *G06T 19/20* | (2011.01) |
| *G05B 19/4099* | (2006.01) |

(Continued)

(52) U.S. Cl.
CPC ........ *B29C 67/0088* (2013.01); *B29C 64/386* (2017.08); *G05B 19/4099* (2013.01); *G06F 3/1208* (2013.01); *G06F 3/1256* (2013.01); *G06F 3/1285* (2013.01); *G06T 15/00* (2013.01); *G06T 19/20* (2013.01); *B33Y 50/02* (2014.12); *G05B 2219/35134* (2013.01);
(Continued)

(58) Field of Classification Search
CPC ............ B29V 67/0088; G05B 19/4099; G05B 2219/35134; G05B 2219/49007; G06F 3/1208; G06F 3/1256; G06T 15/00; G06T 19/20; G06T 2219/2004; B33Y 50/02; Y10S 345/948

USPC .......................................................... 700/98
See application file for complete search history.

(56) References Cited

U.S. PATENT DOCUMENTS

2011/0313878 A1* 12/2011 Norman ................. G06Q 30/06
705/26.5
2013/0207972 A1 8/2013 Wu
(Continued)

FOREIGN PATENT DOCUMENTS

KR    2013 0110764    10/2013

OTHER PUBLICATIONS

3DVIA Make; Elevate Your Business With Product Collaborative Personalization. http://www.3ds.com/products-services/3dvia/space-planning-software/make/ retrieved from Internet Feb. 24, 2016.
(Continued)

*Primary Examiner* — Robert Cassity
(74) *Attorney, Agent, or Firm* — Hamilton, Brook, Smith & Reynolds, P.C.

(57) ABSTRACT

Customized 3D-printing can provide users with customized products, but need to be verified for quality and durability. In an embodiment, a method for three-dimensional (3D)-printing a customized product includes loading a 3D-font from a database. The 3D font includes multiple character relations. Each character relation connects any two given characters of the 3D font. The method also includes generating a 3D-representation of a customized article product based on the 3D-font. The customized product is based on a plurality of characters received from a user. A 3D-font as described herein can provide customized, on-demand, 3D-printed products of a particular threshold of quality and durability.

16 Claims, 7 Drawing Sheets

(51) Int. Cl.
  *G06T 15/00* (2011.01)
  *B29C 64/386* (2017.01)
  *B33Y 50/02* (2015.01)
(52) U.S. Cl.
  CPC .............. *G05B 2219/49007* (2013.01); *G06T 2219/2004* (2013.01); *Y02P 80/40* (2015.11); *Y10S 345/948* (2013.01)

(56) References Cited

U.S. PATENT DOCUMENTS

| | | | | |
|---|---|---|---|---|
| 2013/0304604 | A1* | 11/2013 | Hoffman | G06Q 30/0621 705/26.5 |
| 2015/0235069 | A1* | 8/2015 | Kumar | G06K 7/1426 235/462.09 |
| 2015/0370926 | A1* | 12/2015 | Savage | G06F 17/50 703/1 |

OTHER PUBLICATIONS

EP Search Report for EP 16 17 6886 dated Feb. 21, 2017 entitled "3D Fonts for Automation of Design for Manufacturing".

* cited by examiner

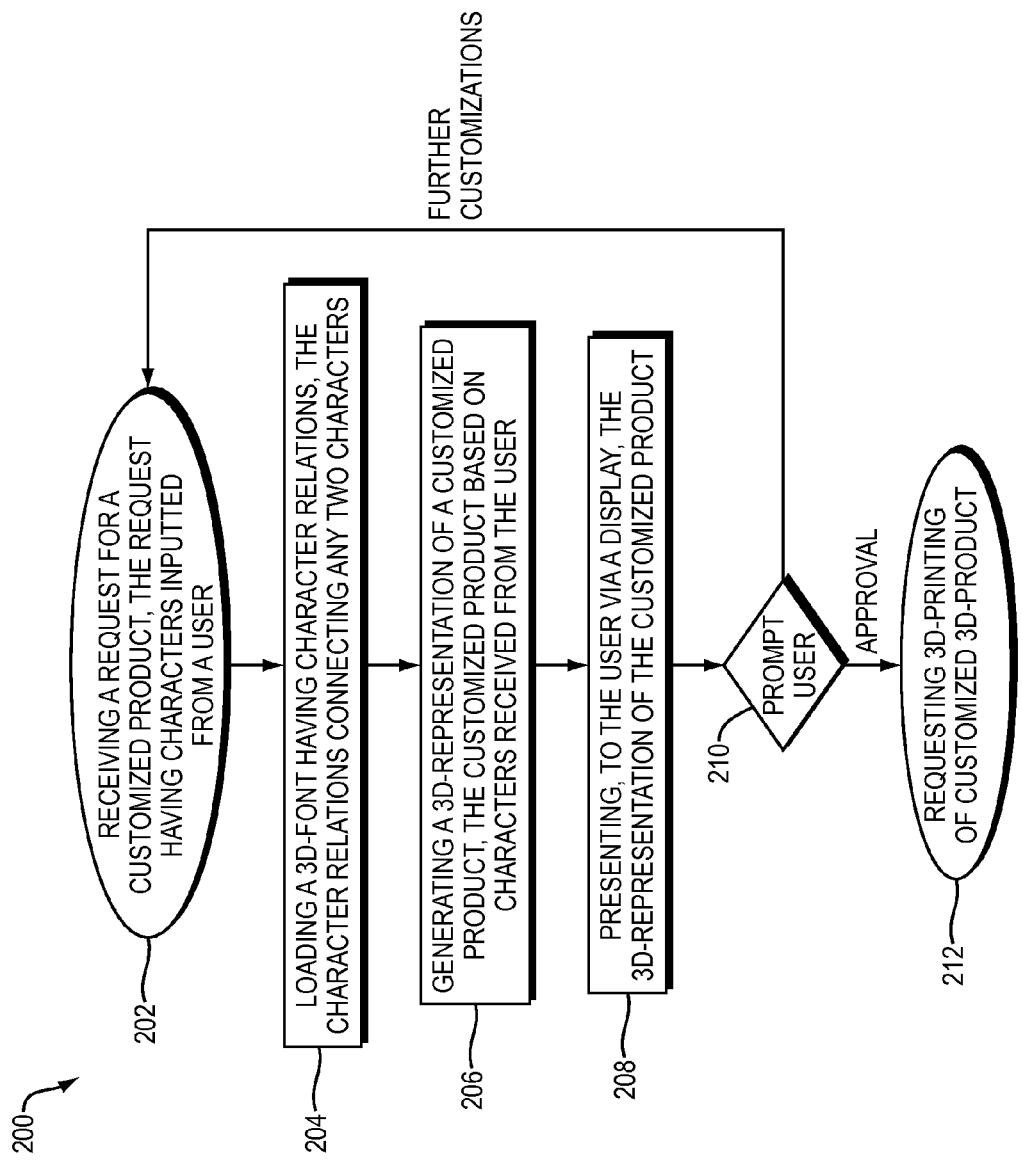

3D FONTS FOR AUTOMATION OF DESIGN FOR MANUFACTURING

BACKGROUND

Computer systems currently employ two-dimensional (2D)-fonts for displaying text. These fonts can be displayed on a virtual user display or printed on two-dimensional media, such as paper or posters. 2D-fonts typically have a character for each symbol. Some 2D-fonts are separated from letter to letter, for print text, and other 2D-fonts can be connected from letter to letter, to represent cursive, for example.

SUMMARY

In an embodiment, a method for three-dimensional (3D)-printing a customized product includes loading a 3D-font from a database. The 3D font includes multiple character relations. Each character relation connects any two given characters of the 3D font. The method also includes generating a 3D-representation of a customized product based on the 3D-font. The customized product is based on a plurality of characters received from a user.

In an embodiment, the method can further include 3D-printing the customized product according to the generated 3D-representation.

In an embodiment, the method can include presenting, to the user via a display, the 3D-representation of the customized product. The method can further include prompting the user to (a) approve the customized product for 3D-printing or (b) enter in further customizations of the customized product.

In an embodiment, the 3D-font includes a matrix of character relations indexed by first index and second index. Each character relation represents a connection transitioning a character represented by the first index to a character represented by the second index.

In an embodiment, method can further include creating the 3D-font for a particular material by determining a minimum threshold of the particular material to connect the any two given characters based on mechanical characteristics of the particular material. The method can additionally include loading the mechanical characteristics of the particular material from a memory. The method further includes loading a 3D-font template having templates of connections of a plurality of characters at a determined spacing. The method further includes, based on the mechanical characteristics of the particular material and the determined spacing, determining an amount of material for the connections of the plurality of characters. The method further includes generating the 3D-font by applying the amount of material to the templates of connections of the 3D-font template.

In an embodiment, the method further includes receiving a request for a customized product from the user. The request including the plurality of characters inputted from the user.

In an embodiment, a system for three-dimensional (3D)-printing a customized product includes a processor coupled with a memory configured to execute instructions. The instructions include loading a 3D-font from a database in the memory. The 3D font includes a plurality of character relations. Each character relation can connect any two given characters of the 3D font. The instructions further include generating a 3D-representation of a customized product based on the 3D-font. The customized product can be based on a plurality of characters received from a user.

In an embodiment, the instructions further include directing a 3D-printer to 3D-print the customized product according to the generated 3D-representation.

In an embodiment, the instructions further include presenting, to the user via a display, the 3D-representation of the customized product, and prompting the user to (a) approve the customized product for 3D-printing or (b) enter in further customizations of the customized product.

In an embodiment, the 3D-font comprises a matrix of character relations indexed by first index and second index. Each character relation represents a connection transitioning a character represented by the first index to a character represented by the second index.

In an embodiment, the instructions further include creating the 3D-font for a particular material by determining a minimum threshold of the particular material to connect the any two given characters based on mechanical characteristics of the particular material.

In an embodiment, creating the 3D-font further includes loading the mechanical characteristics of the particular material from a memory. The instructions further include loading a 3D-font template having templates of connections of multiple characters at a determined spacing. The instructions further include, based on the mechanical characteristics of the particular material and the determined spacing, determining an amount of material for the connections of the plurality of characters. The instructions further include generating the 3D-font by applying the amount of material to the templates of connections of the 3D-font template.

In an embodiment, the instructions further include receiving a request for a customized product from the user. The request having the plurality of characters inputted from the user.

In an embodiment, a method for creating a three-dimensional (3D)-font includes creating a 3D-font for a particular material by determining a minimum threshold of the particular material to connect any two given characters based on mechanical characteristics of the particular material.

In an embodiment, the method further includes loading the mechanical characteristics of the particular material from a memory. The method further includes loading a 3D-font template having templates of connections of a plurality of characters at a determined spacing. The method further includes, based on the mechanical characteristics of the particular material and the determined spacing, determining an amount of material for the connections of the plurality of characters. The method further includes generating the 3D-font by applying the amount of material to the templates of connections of the 3D-font template.

In an embodiment, the method further includes populating a matrix of character relations indexed by first index and second index. Each character relation represents a connection transitioning a character represented by the first index to a character represented by the second index.

In an embodiment, each character relation provides an amount of material for each connection.

In an embodiment, a system for creating a three-dimensional (3D)-font includes a font creation module configured to create a 3D-font in a memory for a particular material by determining a minimum threshold of the particular material to connect any two given characters based on mechanical characteristics of the particular material.

In an embodiment, the creation module is further configured to, load the mechanical characteristics of the particular material from a memory, load a 3D-font template having templates of connections of multiple characters at a determined spacing, based on the mechanical characteristics of the particular material and the determined spacing, determine an amount of material for the connections of the plurality of characters, and generate the 3D-font by applying the amount of material to the templates of connections of the 3D-font template.

In an embodiment, the creation module is further configured to populate a matrix of character relations indexed by first index and second index. Each character relation represents a connection transitioning a character represented by the first index to a character represented by the second index.

In an embodiment, each character relation provides an amount of material for each connection.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is a flow diagram illustrating a process of using the 3D-font employed by an example embodiment of the present invention.

DETAILED DESCRIPTION

Figure 1A:
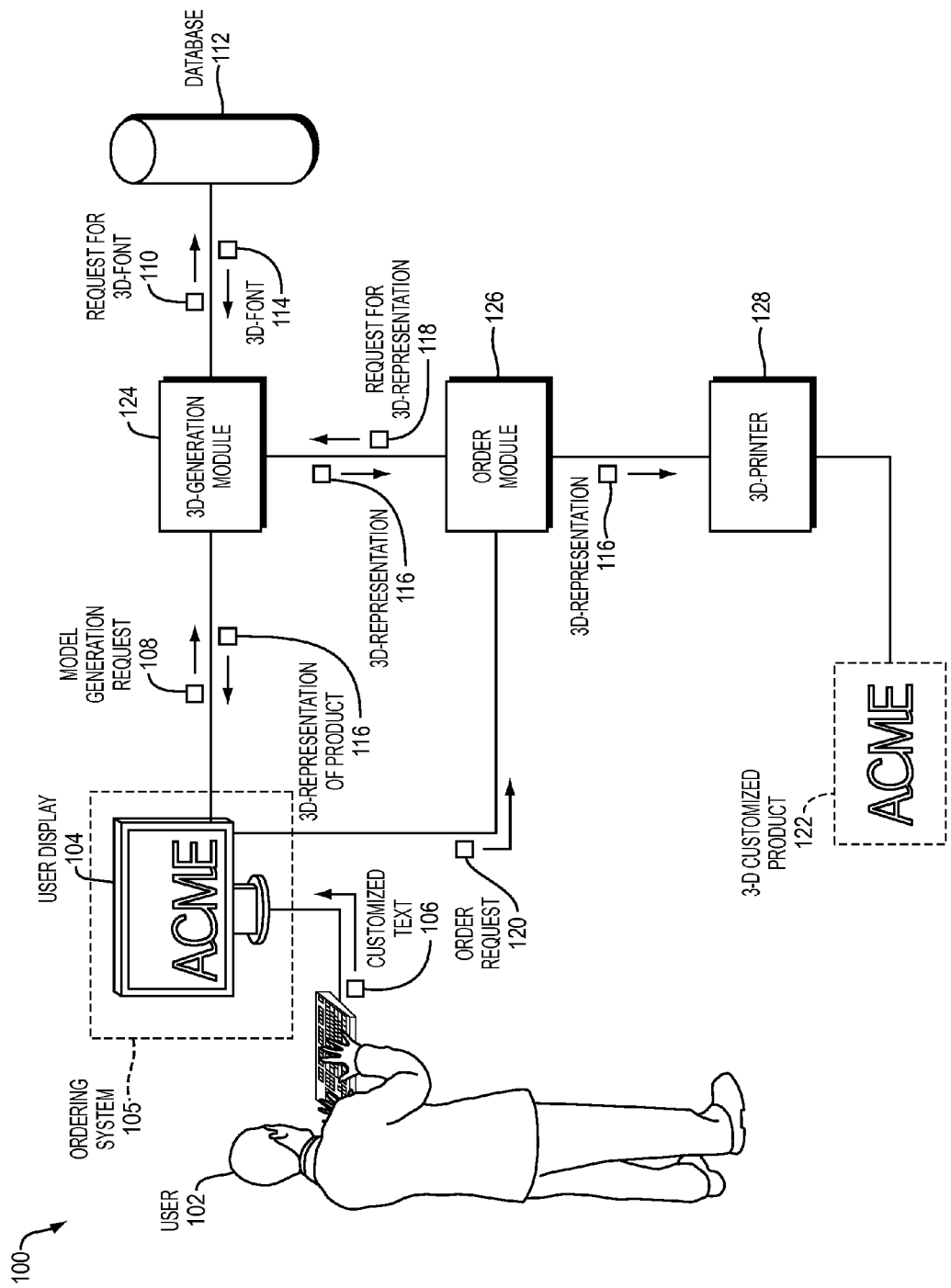
FIG. 1A is a block diagram illustrating an example embodiment of the present invention using a 3D-font.

A description of example embodiments of the invention follows.

Three-dimensional (3D)-printing enables economical and fast production of customizable products. 3D-printing uses a 3D-printer to create a physical, 3D-object from a 3D-printing file. Often times, the 3D-printer creates the object using layers of plastic based on the 3D-printing file. The 3D-printing file can be a 3D-model of an object. In one example, software such as 3DVIA Make, a product of Dassault Systèmes can create such 3D-printing files and send them to the 3D-printer for printing.

In an embodiment of the present invention, using the software, products can be personalized for individual customers from within a website of a retailer or brand, keeping each business in control over the customer experience. Orders can be fulfilled on-demand by a 3D-printing service or local bureau, reducing the need to stock a wide variety of products. For example, a customer can visit a retailer website or electronic-store (e-store or eStore) and create a personalized necklace, or other product, by selecting from a wide variety of materials, colors, shapes and designs.

Using a What You See is What You Get ("WYSIWYG") interface, customers can see the personalized product from a 360-degree viewing angle before deciding whether to purchase the personalized product. The personalized, unique product, such as the item of jewelry, can then be printed using a 3D printer and shipped to the consumer on-demand.

3D printing allows retailers to reduce inventory and create products on-demand. Embodiments of the present invention enable customers to take advantage of this flexibility through collaborative personalization that provides advantages for the customer, retailer and brand by allowing consumers to easily create personalized products to meet their exact needs with little infrastructure cost for the retailer, Embodiments of the present invention are the first 3D solution designed for integration into a business's website to give customers a virtual design experience. Embodiments of the invention can be employed for products that can be personalized. Examples of personalized products include, but are not limited to, jewelry, toys, and accessories. Such examples of 3D-printing are helpful when the product is known and designed by a designer, such as a custom part for a machine. One problem with current 3D-printing is the ability of a user to create an on-demand custom product that is structurally stable and durable. For example, a customer may desire to have a 3D-printed object having custom text or symbols. However, a 3D-modeler designing and verifying each customized design is costly, time-consuming, and slows down turnaround for the customer ordering the customized 3D-printed product. Therefore, it is desirable to create a system to automatically create a customized 3D-product for a user that is verified to be structurally stable without requiring independent design.

One challenge for automatically creating customized 3D-products is creating structurally stable and reliable connections between each letter/character of the customized text. A physical link of material should exist between every two characters. However, even among just lowercase letters, there are $26^2$, or 676, possible transitions between any two characters. Many more transitions between letters exist when considering numbers, upper-case letters, non-alphabet symbols, and symbols from other languages. Therefore, each combination of characters, using different materials, can use different types of connections. For example, a weaker material may use more material (e.g., a thicker link) to establish a more stable link between the two characters, where a stronger material may use less material (e.g., a thinner link). With the 3D-font, a customer can create a custom string of text that is connected in 3D, enabling a 3D-printer to print the customized string of text. The customized product could be a 3D-name plate, necklace, jewelry, or other customized product.

In an embodiment of the present invention, a 3D-font provides connections between any two characters for a particular material that is verified to be stable. In an embodiment, the 3D-font includes 3D-representations of each character and 3D-transition between each character on a per-material basis. For example, different types of plastics may have different strengths. Therefore, a 3D-font can be customized to each material, such that each per-material 3D-font is optimized for the 3D-printing material of the product. In other embodiments, a 3D-font can be generated for a particular material based on properties of the material.

FIG. 1A is a block diagram 100 illustrating an example embodiment of the present invention using a 3D-font. A user 102 inputs customized text 106 into a system having a user display 104. The system sends a model generation request 108 to a 3D-generation module 124. The model generation request 108 can include the customized text 106, material of the customized product requested by the user, the size of the product, and any other parameters to generate the product. The 3D-generation module 124 responsively issues a request for a 3D-font 110 to a database 112, and loads the 3D-font 114 from the database 112. A person of ordinary skill in the art can recognize that the database 112 can store multiple 3D-fonts, and the request for the 3D-font 110 can specify which 3D-font to select. The request 110 can further specify a material for 3D-printing, and the returned 3D-font 114 can be specific to that material. The request 110 can further specify a font size for 3D-printing, and the returned 3D-font 114 can be specific to that font size. Alternatively, the 3D-font 114 can be structured as a size-agnostic template, and be scalable to all sizes, and the 3D-generation module can scale the content based on the size of the requested product.

The 3D-generation module 124 then generates a 3D-representation of the product 116. The 3D-representation of the product 116 can be a file used to 3D-print the product, and also to generate a 3D-rendering of the product to display to the user 102 at the user display 104. In an example embodiment, the 3D-representation of the product 116 can be a software file that can be used to render and 3D-print the product. Upon user approval, the user can issue an order request 120 to an order module 126. Responsively, the order module 126 issues a request for 3D-representation 118 to the 3D-generation module 124, and the 3D-generation module 124 responsively issues the 3D-representation 116 to the order module 126. In other embodiments, the order request 120 can include the 3D-representation 116, or the order module 126 can request the 3D-representation 116 from the ordering system 105.

The order module 126 further processes order details from the user 102 (e.g., payment information, shipping information, rush ordering, etc.). The order module 126 then sends the 3D-representation 116 to a 3D-printer 128. The 3D-printer 128 is configured to print the 3D-representation 116 to a 3D-customized product 122, which can then be sent to the customer.

Figure 1B:
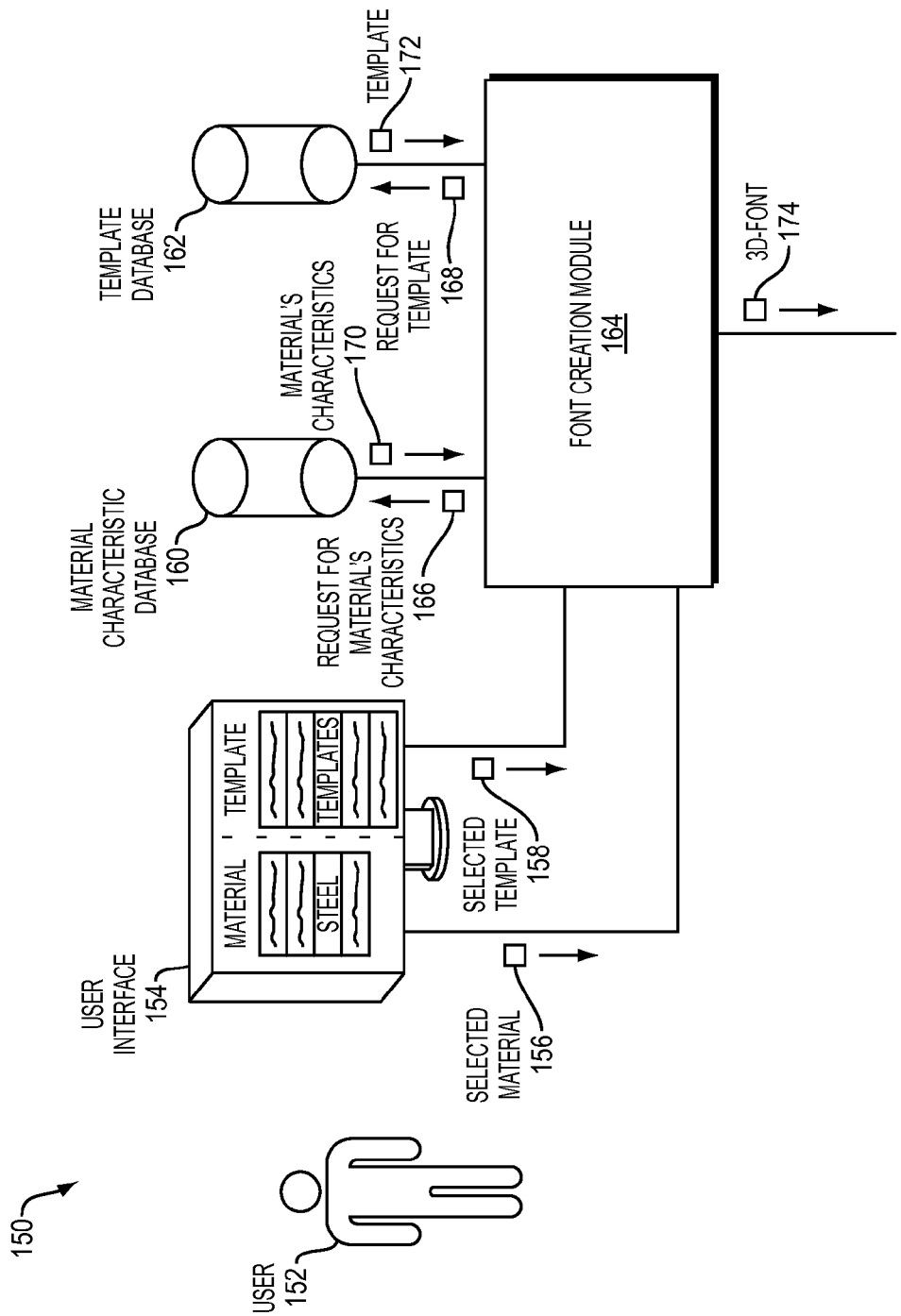
FIG. 1B is a block diagram illustrating an example embodiment of the present invention creating a 3D-font.

FIG. 1B is a block diagram 150 illustrating an example embodiment of the present invention creating a 3D-font. A user 152 using a user interface 154 having a display selects a selected material 156 and selected template 158 among multiple presented materials and multiple presented templates shown on the user interface 154. In FIG. 1B, the user 152 is shown to have selected "steel" as the selected material 156 and "template 3" as the name of the selected template 158. A person of ordinary skill in the art can employ a system with additional materials and templates, however.

The creation of a 3D-font can vary because strength of materials can differ based on the material's characteristics, and the design of the material can differ based on the font template. For example, a weaker material typically requires more material to be applied to reach a strength representative of a quality threshold for the end product. Likewise, different templates may use different shapes that require more or less material be applied. For example, a template that calls for straight connections may require less material than connections having bends, based on the material's strength characteristics for bends. A person of ordinary skill in the art can recognize that the automatic creation of a 3D-font producing durable customized products is based on consideration of at least these factors.

The user interface 154 sends the selected material 156 and selected template 158 to a font creation module 164 (in some embodiments, through intermediary modules, processors, busses, or networks). The font creation module 164 sends a request 166 for material's characteristics to a material characteristic database 160 (or memory) and also sends a request 168 for the template to a template database 162. Responsively, the material characteristic database 160 returns the material's characteristics 170 to the font creation module 164 and the template database 162 returns the template 172. A person of ordinary skill in the art can recognize that in this embodiment, the selected material 156 and selected template 158 are indications of the respective material and template, and not the data of the material's characteristics and the template itself. However, in other embodiments, the user interface 154 can send this information directly to the font creation module 164.

Based on the material's characteristics 170 and template 172 loaded from the respective databases/memories (160/162), the font creation module 164 generates the 3D-font. The font creation module 164 generates the connections between the characters available by the 3D-font based on the material's characteristics 170 and the template 172. The created 3D-font 174 can then be used to create customizable, on-demand products in the system described above in relation to FIG. 1A.

A person of ordinary skill in the art can recognize that a 3D-font can also be created manually by a 3D-font designer, and subsequently used in the system described above in relation to FIG. 1A. However, automatic creation of the font saves time and increases efficiency of font creation.

FIG. 2 is a flow diagram 200 illustrating a process of using the 3D-font employed by an example embodiment of the present invention. First, a system, such as an online retailer, receives a request for a customized product from a user (202). The request has characters inputted from the user. The characters can be in the form of a string data structure, for example. The process then loads a 3D-font from a memory (204). The 3D-font has character relations connecting any two characters available in the 3D-font. The system then generates a 3D-representation (e.g., a file for use with a software program or website) of a customized product (206). The customized product is based on the characters (e.g., the string) received from the user. The system then presents, to the user via a display, the 3D-representation of the customized product (208). The system then prompts the user to either (a) approve the customized product for 3D-printing or (b) enter in further customizations of the customized product (210). If the user selects further customizations, the system then receives an updated request for the customized product (202). If the user approves, the system then requests 3D-printing of the customized 3D-product by sending the 3D-representation file to a 3D-printer (212).

Figure 3:
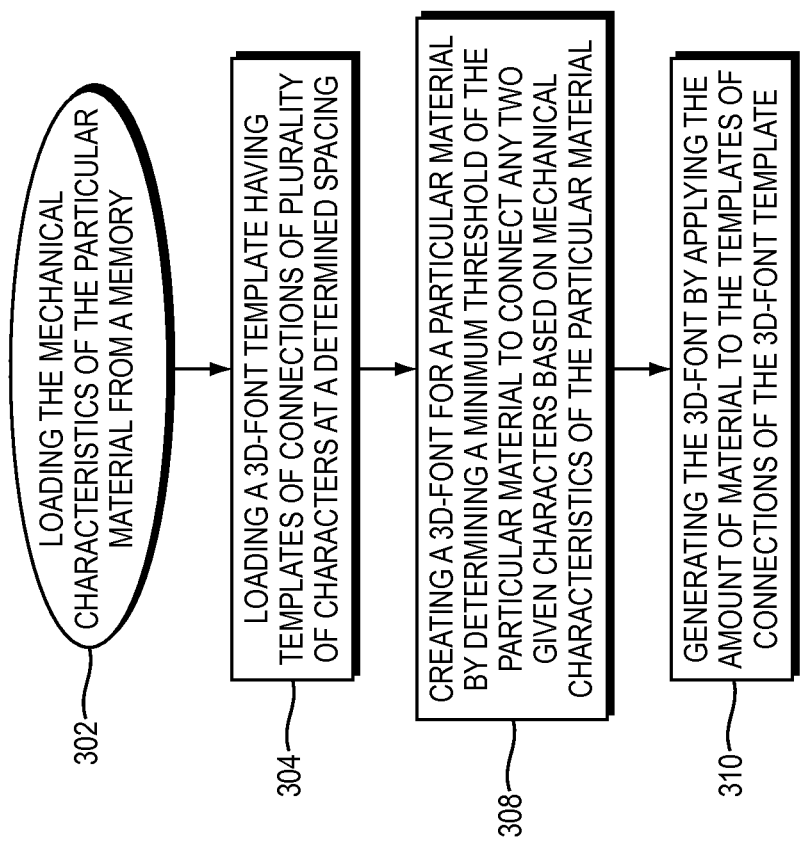
FIG. 3 is a flow diagram illustrating a process creating a 3D-font employed by an example embodiment of the present invention.

FIG. 3 is a flow diagram 300 illustrating a process creating a 3D-font employed by an example embodiment of the present invention. The system loads the mechanical characteristics of a particular material from a memory (302). The system then loads a 3D-font template having templates of connections of a plurality of characters at a determined spacing (304). Examples of a 3D-font template can be the 3D-shapes of connections between characters. However, the 3D-font template may lack information indicating the amount of material (e.g., volume) of each connection. The system then creates the 3D-font for a particular material by determining a minimum threshold of the particular material to connect any two given characters based on mechanical characteristics of the particular material (308). For example, the system can determine, based on the strength of the material, how much material is needed to create a stable, durable connection between two characters of the font indicated by the 3D-font template. Then, the system generates the 3D-font by applying the amount of material to the templates of connections of the 3D-font template (310).

Figure 4:
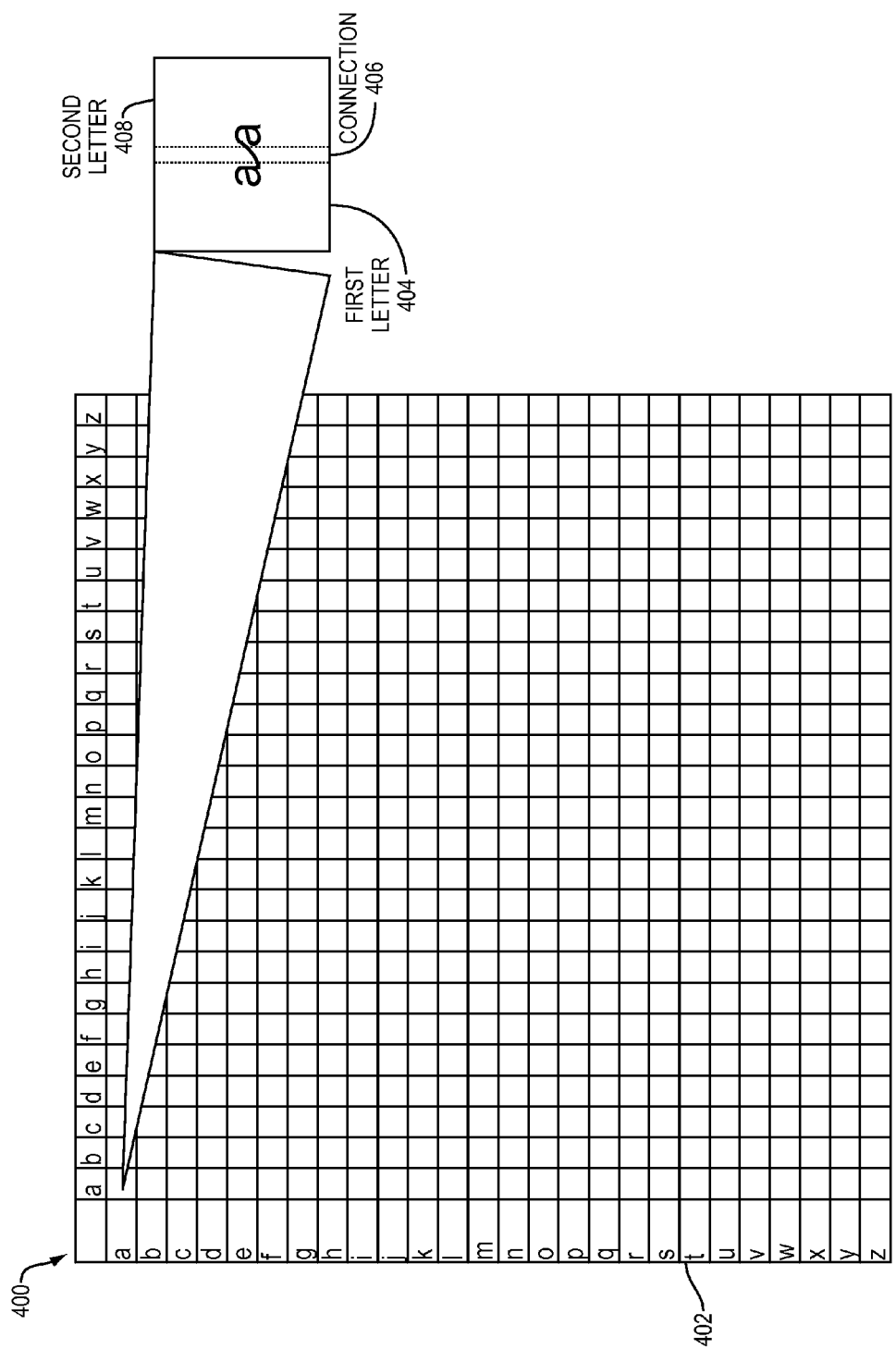
FIG. 4 is a diagram illustrating a table employed by an example embodiment of the present invention.

FIG. 4 is a diagram 400 illustrating a table 402 employed by an example embodiment of the present invention. FIG. 4 illustrates an example table 402 of connections between lowercase letters. This is one element of the 3D-font. In an embodiment, the rows of the table represent a first, or originating, character, and the columns of the table represent a second, or transitioning, character. Each entry of the table 402, therefore, represents the transition from the first character to the second character. For example, the entry of the table corresponding to the row of "r" and the column of "o" represents the transition from the character 'r' to the character 'o' in the 3D-font. A person of ordinary skill in the art can further recognize that the originating characters and transitioning characters can include other characters not shown in FIG. 4.

The 3D-font can also include the letters themselves, as well as other transition tables. The other transition tables can include transitions from uppercase letters to uppercase letters, uppercase letters to lowercase letters, transitions from any letters to symbols, transitions from letters to numbers, transitions from numbers to symbols, or any other transition between characters. In addition, the table 402 can be expanded to symbols and other characters in addition to letters.

In one non-limiting embodiment, the 3D-font can include a lowercase-to-lowercase character transition table, an uppercase-to-uppercase character transition table, a number-to-number character transition table, and an uppercase-to-lowercase character transition table. This would allow the user to input many names having capital letters as the first letter, and/or sets of numbers. Additional tables could provide a lowercase-to-uppercase character transition table, to allow for a name such as "McCoy," as one example. In addition, additional tables, such as an uppercase-to-symbol character transition table and a symbol-to-uppercase character transition table could allow transitions for a name having a symbol character such as "O'Malley." A person of ordinary skill in the art can recognize other tables that may be desirable based on the types of transitions needed for each personalized product. Adding additional tables can require using more memory to store the 3D-font, however, assuming the system has adequate memory, the 3D-font system is scalable to allow for additional tables for different character type transitions beyond those explicitly listed herein.

FIG. 4 further illustrates the specific transition from the lowercase letter 'a' to the lowercase letter 'a.' The table 402, in this entry, stores a first letter 404 (e.g., 'a') and a second letter 408 (e.g., 'a'). A connection 406 is a path connecting the first letter 404 and second letter 408 in the 3D file. The connection 406 in one embodiment can be a template, which shows the path of the connection, but not the volume or material. In another embodiment, if the material to be used for the 3D-font is known, or the 3D-font is material specific, the connection 406 can include a volume and specific shape and volume. The connection 406 stored in the 3D-font can be a 2D-profile of the path to connect the first letter 404 to the second letter 408. In such an embodiment, the system can project a 3D-volume of the connection 406 for the 3D-printer by, for example, extruding the 2D connection 406. In other embodiments, the connection 406 can include the 3D-shape, and can be expanded, contracted, transposed, translated, or skewed along an appropriate axis or multiple appropriate axes based on the product needs.

The table 402 can, in some embodiments, include the first letter 404, connection 406 and second letter 408. The table 402 can, in other embodiments, include the connection 406 without the first letter 404 and second letter 408, and store each letter separately in a vector, linked list, or other data structure, which can save memory because each letter can be the same regardless of the proceeding letter, and therefore only needs to be stored once per font, and not once per letter per font. However, a person of ordinary skill in the art could also design an embodiment of the 3D-font which has both the connection 406 and second letter 408 dependent on the preceding first letter, which needs the first letter 404, connection 406 and second letter 408 to be stored in the table 402.

Figure 5:
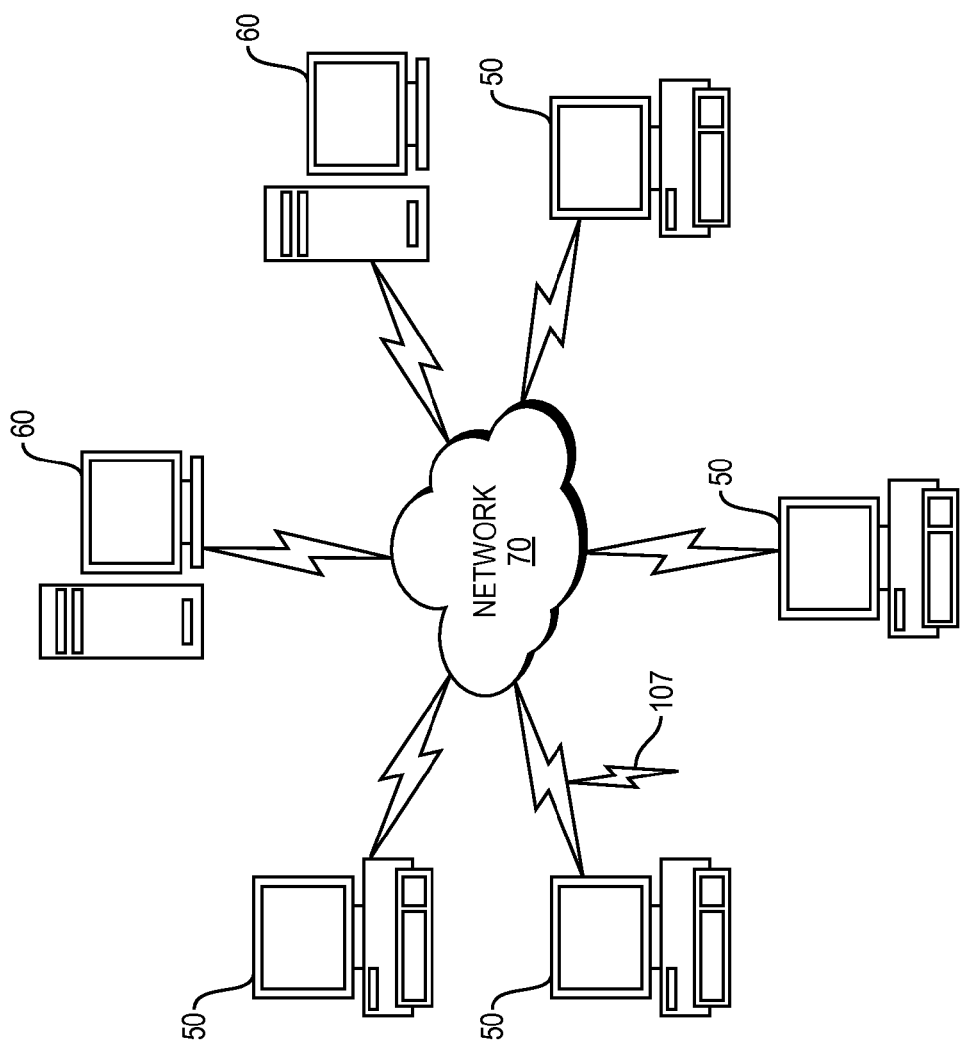
FIG. 5 illustrates a computer network or similar digital processing environment in which embodiments of the present invention may be implemented.

FIG. 5 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
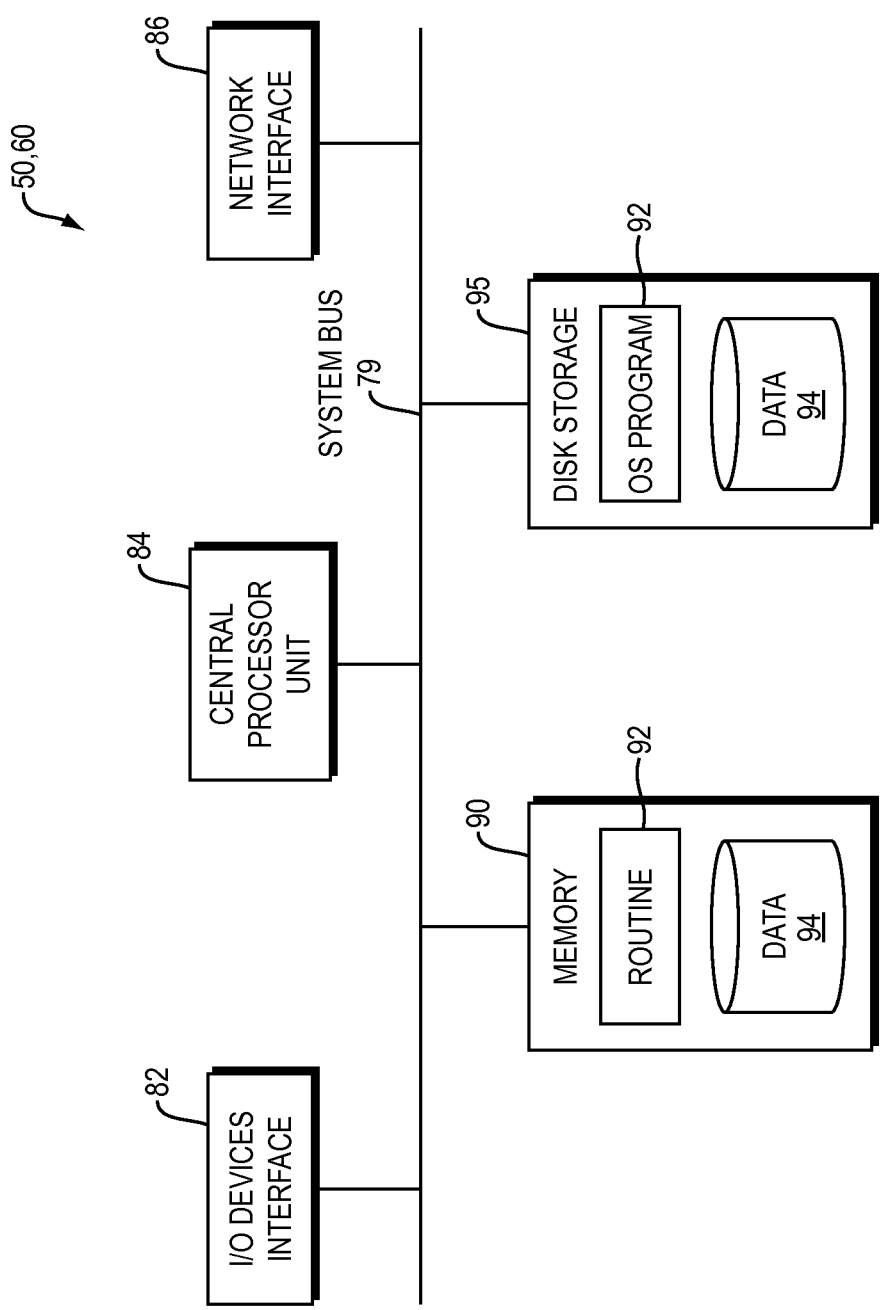
FIG. 6 is a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., user input module, intent module, mapping module, display module, virtual assistant). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

While this invention has been particularly shown and described with references to example embodiments thereof, it will be understood by those skilled in the art that various changes in form and details may be made therein without departing from the scope of the invention encompassed by the appended claims.

What is claimed is:

1. A method for three-dimensional (3D)-printing a customized product, the method comprising:
    loading a 3D-font from a database, wherein the 3D font includes a matrix of character relations having a first index of every character of the 3D font and a second index of every character in the 3D font, each character relation of the matrix representing a physical connection transitioning a character represented by the first index to a character represented by the second index;
    generating a 3D-representation of a customized product based on the 3D-font, the customized product based on a plurality of characters received from a user, and
    3D-printing the customized product according to the generated 3D-representation.

2. The method of claim 1, further comprising:
    presenting, to the user via a display, the 3D-representation of the customized product; and
    prompting the user to (a) approve the customized product for 3D-printing or (b) enter in further customizations of the customized product.

3. The method of claim 1, further comprising:
    creating the 3D-font for a particular material by determining a minimum threshold of the particular material to connect any two given characters based on mechanical characteristics of the particular material.

4. The method of claim 3, wherein creating the 3D-font further includes:
    loading the mechanical characteristics of the particular material from a memory;
    loading a 3D-font template having templates of connections of a plurality of characters at a determined spacing;
    based on the mechanical characteristics of the particular material and the determined spacing, determining an amount of material for the connections of the plurality of characters; and
    generating the 3D-font by applying the amount of material to the templates of connections of the 3D-font template.

5. The method of claim 1, further comprising receiving a request for a customized product from the user, the request having the plurality of characters inputted from the user.

6. A system for three-dimensional (3D)-printing a customized product, the system comprising:
    a processor coupled with a memory configured to execute instructions including:
        loading a 3D-font from a database in the memory, wherein the 3D font includes a matrix of character relations having a first index of every character of the 3D font and a second index of every character in the 3D font, each character relation of the matrix representing a physical connection transitioning a character represented by the first index to a character represented by the second; and
        generating a 3D-representation of a customized product based on the 3D-font, the customized product based on a plurality of characters received from a user;
        directing a 3D- printer to 3D-print the customized product according to the generated 3D-representation.

7. The system of claim 6, wherein the instructions further include:
    presenting, to the user via a display, the 3D-representation of the customized product; and
    prompting the user to (a) approve the customized product for 3D-printing or (b) enter in further customizations of the customized product.

8. The system of claim 6, wherein the instructions further include:
    creating the 3D-font for a particular material by determining a minimum threshold of the particular material to connect the two given characters based on mechanical characteristics of the particular material.

9. The system of claim 8, wherein creating the 3D-font further includes:
    loading the mechanical characteristics of the particular material from a memory;
    loading a 3D-font template having templates of connections of a plurality of characters at a determined spacing;
    based on the mechanical characteristics of the particular material and the determined spacing, determining an amount of material for the connections of the plurality of characters; and
    generating the 3D-font by applying the amount of material to the templates of connections of the 3D-font template.

10. The system of claim 6, wherein the instructions further include receiving a request for a customized product from the user, the request having the plurality of characters inputted from the user.

11. A method for creating a three-dimensional (3D)-font, the method comprising:
    creating a 3D-font for a particular material by determining a minimum threshold of the particular material to form a physical connection of any two given characters, using the particular material to form the physical connection, based on mechanical characteristics of the particular material, and populating a matrix of character relations indexed by a first index and a second index, wherein each character relation represents the physical connection transitioning a character represented by the first index to a character represented by the second index.

12. The method of claim 11, further comprising:
    loading the mechanical characteristics of the particular material from a memory;
    loading a 3D-font template having templates of connections of a plurality of characters at a determined spacing;
    based on the mechanical characteristics of the particular material and the determined spacing, determining an amount of material for the connections of the plurality of characters; and generating the 3D-font by applying the amount of material to the templates of connections of the 3D-font template.

13. The method of claim 11, wherein each character relation provides an amount of material for each connection.

14. A system for creating a three-dimensional (3D)-font, the system comprising:
 a processor coupled with a memory configured to execute instructions including:
 creating a 3D-font in a memory for a particular material by determining a minimum threshold of the particular material to form a physical connection of any two given characters, using the particular material to form the physical connection, based on mechanical characteristics of the particular material; and
 populating a matrix of character relations indexed by a first index and a second index, wherein each character relation represents the physical connection transitioning a character represented by the first index to a character represented by the second index.

15. The system of claim 14, wherein the instructions further includes:
 loading the mechanical characteristics of the particular material from a memory;
 loading a 3D-font template having templates of connections of a plurality of characters at a determined spacing;
 based on the mechanical characteristics of the particular material and the determined spacing, determining an amount of material for the connections of the plurality of characters; and
 generating the 3D-font by applying the amount of material to the templates of connections of the 3D-font template.

16. The system of claim 14, wherein each character relation provides an amount of material for each connection.

* * * * *